「United States Patent」 [19]
Kanekawa et al.

[11] Patent No.: US 6,344,809 B1
[45] Date of Patent: Feb. 5, 2002

(54) LINE INTERFACE CIRCUIT AND INFORMATION COMMUNICATION APPARATUS USING IT

(75) Inventors: Nobuyasu Kanekawa; Yasuyuki Kojima, both of Hitachi; Seigou Yukutake, Hitachinaka; Minehiro Nemoto, Hitachi; Kazuhisa Takami, Hitachi; Takayuki Iwasaki, Hitachi; Yusuke Takeuchi, Hachioji; Yasuo Shima, Ohme, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/704,687

(22) Filed: Nov. 3, 2000

(30) Foreign Application Priority Data

Apr. 28, 2000 (JP) ............................................. 12-134188

(51) Int. Cl.[7] ................................................. H03M 9/00
(52) U.S. Cl. ....................................................... 341/101
(58) Field of Search .................................. 341/101, 100

(56) References Cited

U.S. PATENT DOCUMENTS 5,367,300 A * 11/1994 Fong ........................... 341/101

6,252,527 B1 * 6/2001 Yang ............................ 341/101

OTHER PUBLICATIONS

Japanese Patent Application Laid–Open No. 62–260408 (1987).

Japanese Patent Application Laid–Open No. 11–136293 (1999).

Japanese Patent Application Laid–Open No. 11–317445 (1999).

* cited by examiner

Primary Examiner—Brian Young
(74) Attorney, Agent, or Firm—Antonelli, Terry, Stout & Kraus, LLP

(57) ABSTRACT

In order to reduce the consumption of power of an isolator interface and an ADC, it is proposed to operate a calling signal reception or Caller ID signal reception function only with power supplied from the system switch while maintaining the on-hook condition of a telephone. At the time of normal operation, the output of the analogue digital converter is input to an isolator through the isolator interface, and at the time of the calling signal reception or the caller identification information reception, the output of the analogue digital converter is input directly to the isolator.

12 Claims, 17 Drawing Sheets

LINE INTERFACE CIRCUIT AND INFORMATION COMMUNICATION APPARATUS USING IT

BACKGROUND OF THE INVENTION

This invention relates to an information communicating apparatus connected to a telephone subscriber line, such as a modem device, a telephone set, a facsimile machine, etc., and, more particularly, to a line interface circuit.

In the field of communication, in order to provide for both protection of network facilities having high public use and protection of terminals, a high insulation quality is required at the boundary between a network and a terminal, and, for that reason, compact transformers for communication which make provision for a high insulation quality have been used previously. However, a problem has occurred in that, in proportion to the popularization and evolution of personal terminals, it is required for transformers which are further miniaturized and reduced in weight to be used for a portable terminal; however, this requirement can not be satisfied sufficiently only with improvement in the material and arrangement of parts in the transformers. In light of this, the possible use of an isolator has been examined.

Also, in the application of this technology to the field of measurement, medical treatment or the like, it may be necessary to isolate a signal detecting part and a signal handling part, e.g. a sensor and a signal processing circuit. It is known that an isolator can be used as an isolation and separation means in this case.

For the purpose of making the isolator miniature, reliable and low-cost, a capacitive isolator has been developed. A ceramic capacitor for power application and surge protection, which is made on the basis of a high voltage capacitor technique providing an individual part constituting an-isolation barrier, is known; and, a circuit block for signal transmission using this capacitor is referred to as a capacitive isolation amplifier or a capacitive isolation coupler. This device has been used Since the 1970s.

Also, what is disclosed in Japanese Patent Application Laid-open N6-.62-260408 (1987) achieves isolation and separation of an analogue signal transmission in which a pulse signal obtained by the modulation of the analogue signal is transmitted to the secondary side, which is insulated and separated by a capacitor; and, after decoding, the analogue signal is regenerated.

Further, Japanese Patent Application Laid-open No. 11;136293 (1999) entitled "Isolator Circuit and Monolithic Isolator" and Japanese Patent Application Laid-Open No. 11-317445/1999 entitled "Isolator and Modem Device using it" disclose a technique by which an isolator is formed on an LSI so that it has an isolation and separation function. This technique also provides means for achieving a system LSI including an insulation and separation function for the modem, etc.

A system LSI for a modem including the insulation and separation function according to the above-mentioned technology dispenses with an insulation transformer and a photo coupler, which were needed for insulation previously, whereby it is possible to reduce the number of parts, the cost and the size of the mounting area. It also enables more suitable system design by improving the degree of freedom for chip division without encountering a restriction of the insulating location.

Also, by using electric power supplied from the system switch to operate the line side of two regions (line side: subscriber line side, host side: microprocessor side) on the LSI insulated by an isolator, it is possible to reduce the power consumption of the host side by a large amount. Therefore, it is possible to extend the life of a battery driving the host side in a portable terminal.

However, in the system LSI for a modem including the insulation and separation function disclosed in the above-mentioned Japanese Patent Application Laid-open No. 11-136293 (1999) and Japanese Patent Application Laid-Open No. 11-317445 (1999), further consideration needs to be given to supplying power to a circuit used at the time of the reception of the caller identification information (Caller ID).

In the above-mentioned prior art, the supply of power from the system switch uses a loop current which determines whether a telephone set is in an on-hook condition or an off-hook condition. In general, it is required that a loop current of 20 to 120 mA is caused to flow to inform the system switch of the fact that the telephone set is in an off-hook condition, depending upon the standards defined by the government. Also, in order to inform the system switch of the fact that the telephone set is in the on-hook condition, the loop current must be maintained below a predetermined constant value (for example, 3 mA). Further, at the time of the reception of the Caller ID indication, the on-hook condition must be established in many countries (for example, in Japan), and a circuit for the reception of the Caller ID indication must operate with the consumption of electric power below a predetermined constant value (for example, 3 mA).

SUMMARY OF THE INVENTION

In order to solve the above-mentioned problems, the present invention utilizes the following means:

(1) An isolator interface has a parallel/serial conversion circuit for converting the output of a digital analogue converter having plural bits to a serial signal, or a multiplexer for transmitting in a time divisional manner the output of the analogue digital converter and the status information of a line interface circuit. At the time of a normal operation, the output of the analogue digital converter is input to the isolator via the isolator interface, and at the time of the reception of a call signal, or at the time of the reception of a caller identification signal, the output of the analogue digital converter is input directly to the isolator.

(2) The isolator interface has a parallel/serial conversion circuit for converting the output of the analogue digital converter having plural bits to a serial signal, or a multiplexer for transmitting in a time divisional manner the output of the analogue digital converter and the status information of the line interface circuit, and a clock generating circuit for producing a clock signal of a first frequency and a clock signal of a second frequency lower than the first frequency. At the time of normal operation, the analogue digital converter and the isolator interface are driven by the clock signal of the first frequency output from the clock generating circuit, and, at the time of the reception of the call signal, or at the time of the reception of the caller identification information, the analogue digital converter and the isolator interface are driven by the clock signal of the second frequency output from the clock generating circuit.

BRIEF DESCRIPTION OF THE DRAWINGS

A more complete understanding of the present invention and the advantages thereof may be acquired by reference to the accompanying figures in which like reference numerals indicate like features, and wherein.

DETAILED DESCRIPTION OF THE PREFERRED EMBODIMENTS

Hereinafter, embodiments of this invention will be explained with reference to the attached drawings.

Figure 1:
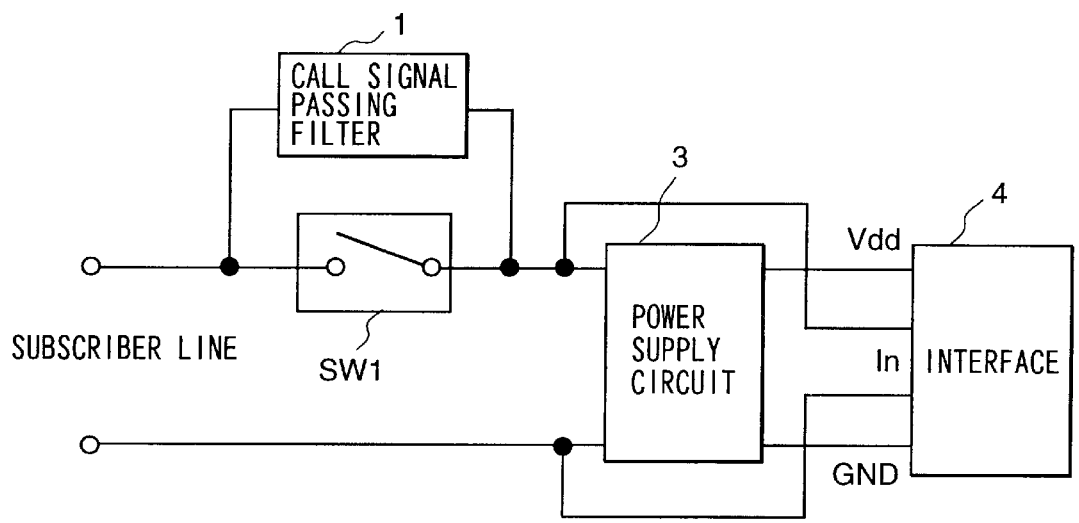
FIG. 1 is a block diagram showing an embodiment of a line interface system according to this invention.

FIG. 1 shows a basic embodiment of this invention. A line interface circuit 4 is connected to a subscriber line through a call signal passing filter 1 and a switch SW1. Also, electric power is supplied from the subscriber line to the line interface circuit 4 through a power supply circuit 3.

Figure 2:
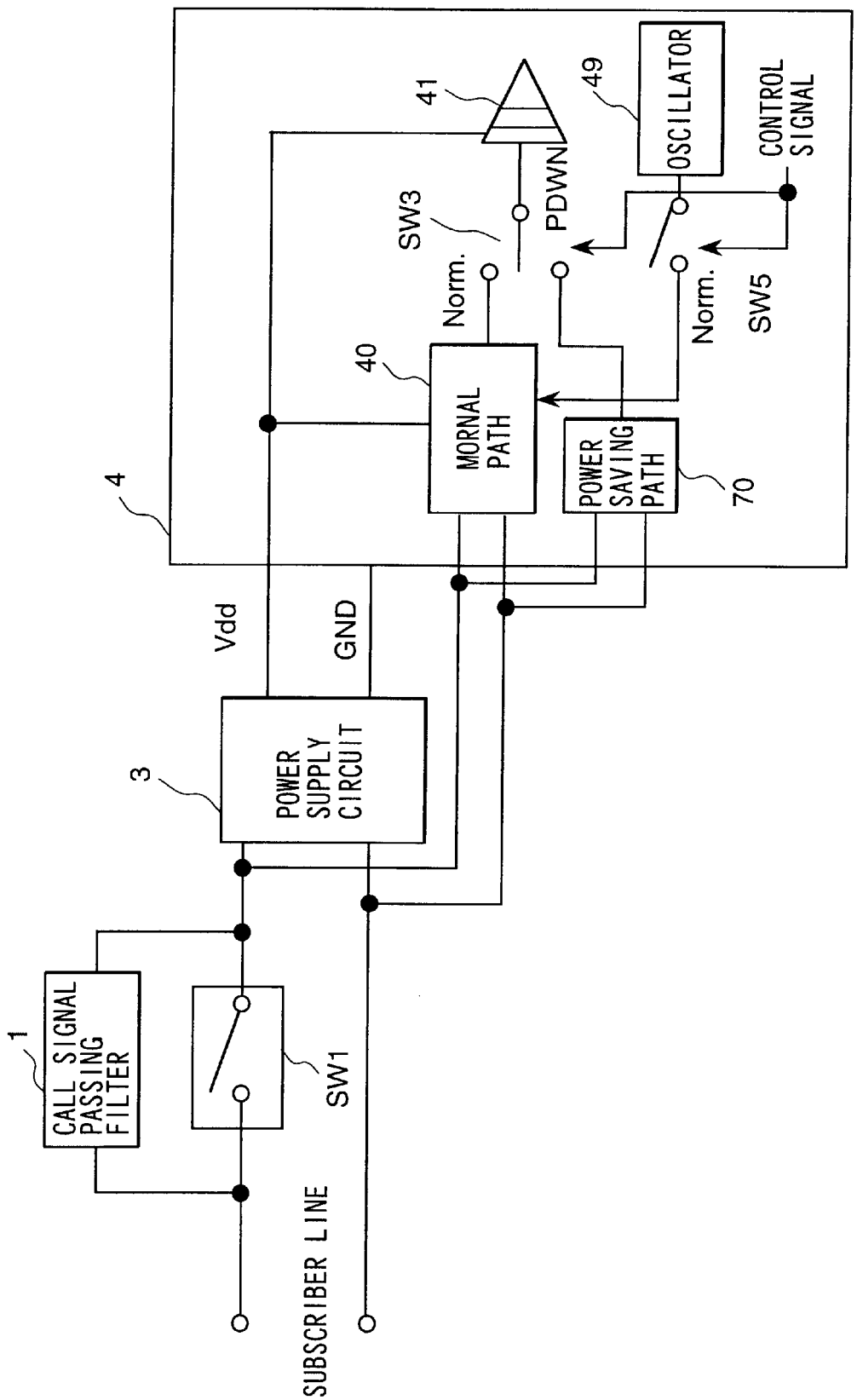
FIG. 2 is a block diagram showing details of the line interface circuit in the system of FIG. 1 according to this invention.

As seen in FIG. 2, the line interface circuit 4 comprises a normal path 40, operating with a clock signal supplied from an oscillator 49, and a power saving path 70 operating without a clock signal.

At the time of a normal call and communication, the contact of a switch SW3 is connected to the Norm. terminal and a switch SW5 is closed. In this case, an input signal is transmitted to a host side, that is, to an isolator 41 through the normal path 40. At that time, Since the switch SW5 is closed, the normal path 40 operates on the basis of the clock signal generated in the oscillator 49.

Also, at the time of a call signal waiting condition, or at the time of the reception of a Caller ID signal which includes caller identification information, the contact of the switch SW3 is connected to the PDWN terminal, and the input signal is transmitted to the host side, that is to the isolator 41, via the power saving path 70. At that time, the switch SW5 is opened, and thus, the normal path 40 is in its sleeping condition, Since the clock signal generated by the oscillator 49 is not supplied thereto.

In this case, the normal path 40 may be constructed by an isolator interface for transmitting data via an analogue/digital converter and the isolator 41 with high efficiency. Since a high dynamic range and S/N characteristic is generally desired at the time of calling or communication, the analogue/digital converter may be provided as an oversampling system in which an integrator is needed or one having a multiple bit arrangement. In a case where the analogue/digital converter has an integrator, a clock signal is needed to administrate the integration time. Also, in a case where the analogue/digital converter is of the type having a multiple bit arrangement, a multiplexer or a parallel conversion circuit must be included to transmit plural bits with a Single bit isolator (for one bit transmission), and a clock signal for driving the multiplexer or the parallel conversion circuit is needed. That is, the clock signal is necessary to operate the normal path 40, which requires a high dynamic range and S/N characteristic.

On the other hand, at the time of the reception of a call signal or a Caller ID signal, since the signal has a sufficient amplitude (on the order of −40 dBm) and is transmitted in the form of an FSK signal which can resist the influence of noises, such a high dynamic range and S/N characteristics are not required, and a simple one-bit Schmitt trigger circuit can be used as the analogue/digital converter.

Thus, the isolator interface for transmitting plural bits with a single bit (per bit) isolator is not needed. Therefore, it is possible for the power saving path 70 to be constructed with a combination circuit and an asynchronous sequential circuit (the Schmitt trigger circuit is considered to be a synchronous sequential circuit because the Schmitt trigger circuit has a history), and in this case no clock signal is needed.

Since the Caller ID signal which includes the caller identification information comprises the telephone number of a caller, which comprises a small amount of information and is transmitted with sufficient amplitude and in the form of FSK modulation which is resistive against noises, the reception circuit need not have a higher S/N or dynamic range than the ordinary modem communication; and, thus, it is possible to implement the circuit in a simple manner and reduce the power consumption.

In accordance with this embodiment, since operation is carried out through the power saving path 70 at the time of the call signal waiting condition or at the time of the reception of the Caller ID signal, it is possible to decrease the power consumption to a large degree and to operate by using as its electric a power minute closed current which cannot be recognized as the off-hook condition.

Figure 3:
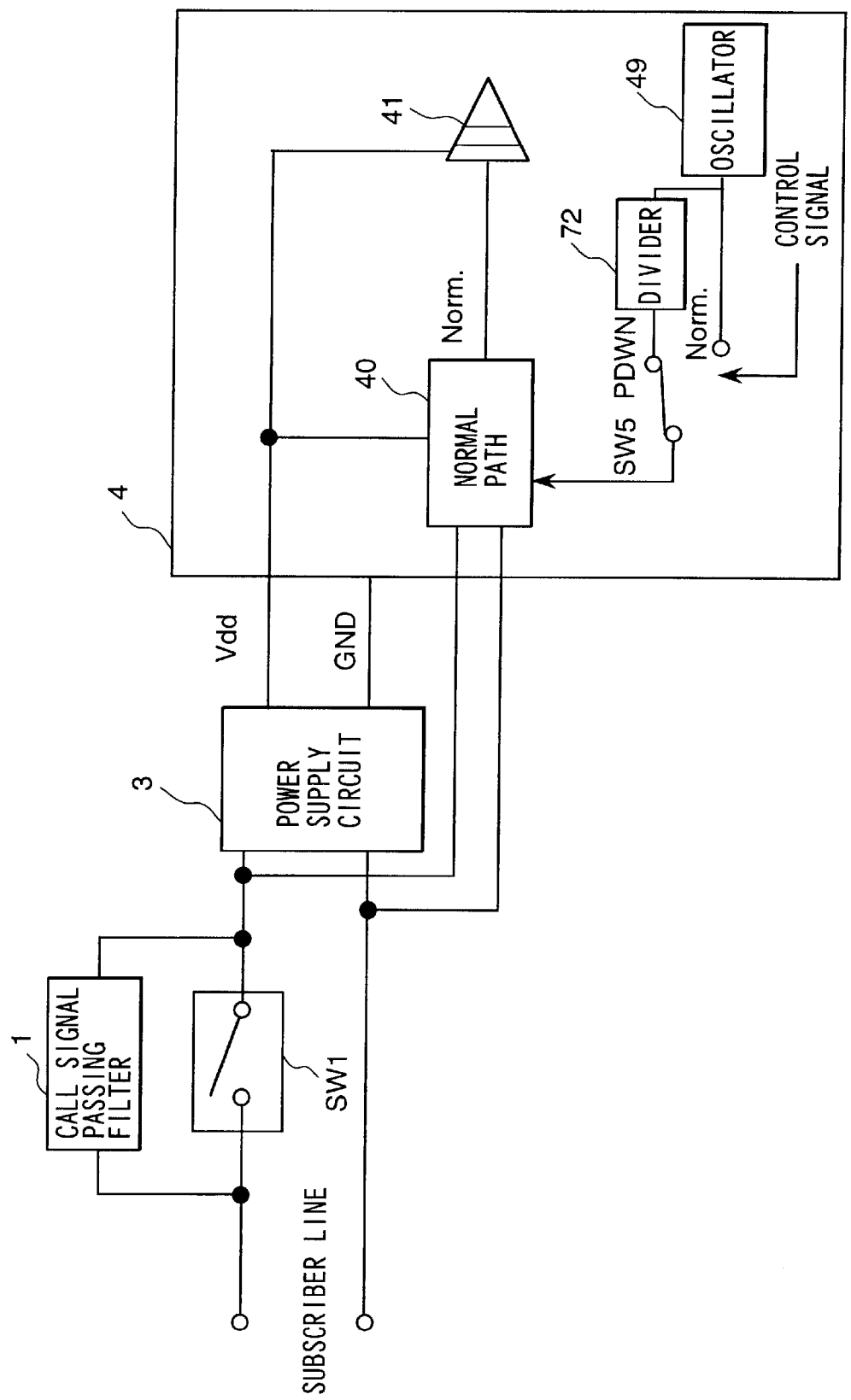
FIG. 3 is a block diagram showing another embodiment of a line interface circuit according to this invention.

FIG. 3 shows an embodiment by which the operative clock frequency is decreased at the time of the call signal waiting condition or at the time of the reception of the Caller ID signal.

During normal calling and communication, just like the embodiment shown in FIG. 2, the input signal is input to the isolator 41 via the normal path 40 so that it is applied to the host side. Also, the contact of the switch SW5 is connected to the Norm. side terminal, whereby the normal path 40 is driven on the basis of the clock signal generated in the oscillator 49.

At the time of the call signal waiting condition, or at the time of the reception of the Caller ID signal, like the case of the normal calling or communication, the input signal is input to the isolator 41 via the normal path 40 so that it is applied to the host side. At that time, however, the contact of the switch SW5 is connected to the PDWN terminal; and, as a result, the clock signal generated by th6 oscillator 49 is applied to a divider 72, so that the clock is divided by 1/N, the divided clock being supplied to the normal path 40 so that it can operate at a period of 1/N.

In accordance with this embodiment, at the time of the call signal waiting condition, or at the time of the reception of the Caller ID signal, the normal path 40 is driven at the frequency of 1/N compared to the frequency used during the normal calling or communication, so the power consumption correspondingly becomes 1/N. Therefore, it is possible to reduce the power consumption significantly, and to operate the interface circuit by using as its electric power a minute closed current which cannot be recognized as the off-hook condition.

Figure 4:
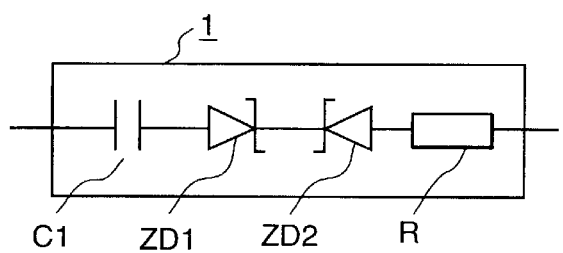
FIG. 4 is a schematic circuit diagram showing an embodiment of a call signal passing filter.

FIG. 4 shows an embodiment of the call signal passing filter 1. It comprises a capacitor C1, Zener diodes ZD1, ZD2 and a resistor R. The capacitor C1 functions to cut off any DC voltage in the signal from the system switch so as to pass only the AC component of the call signal. The Zener diodes ZD1, ZD2 function to block the voltage applied at the time of the normal calling or communication and pass only a call signal of large amplitude, such as 75 Vrms. Also, the resistor R functions to limit the current at the time of the arrival of the call signal and maintain a predetermined impedance. Also, in a case where the resistor R is sufficiently large so as not to affect the normal calling and communication, it is possible to eliminate the Zener diodes ZD1, ZD2.

Figure 5:
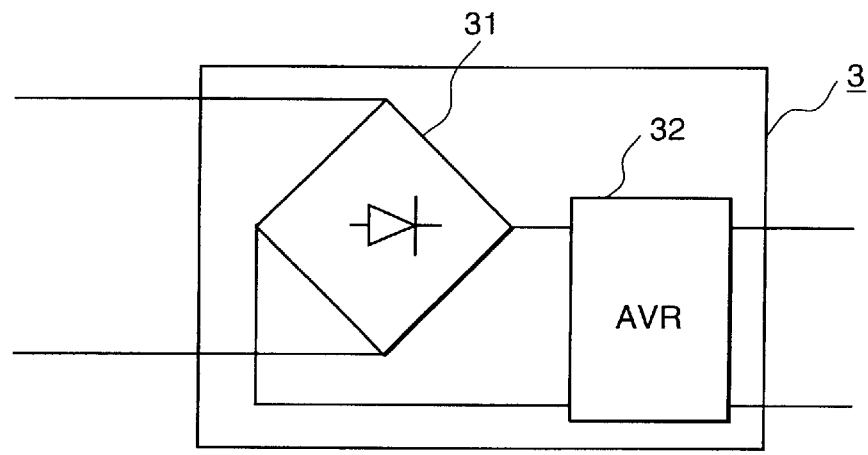
FIG. 5 is a block diagram showing an embodiment of a power supply circuit.

FIG. 5 shows an embodiment of the power supply circuit 3. The power supply circuit 3 comprises a rectifier 31 and an AVR (low voltage regulator) 32. At the time of normal calling or communication, the rectifier 31 assures the operation even if the subscriber line is connected reversely or the signal from the system switch is reverse in polarity. At the time of the reception of the call signal, however, the rectifier 31 functions to rectify the call signal which has passed through the call signal passing filter 1 to transform it to DC so that it can be used as electric power. The AVR 32 functions to supply a constant voltage to the interface 4 regardless of the length of the subscriber line from the system switch, that is, the voltage drop due to the subscriber line.

Figure 6:
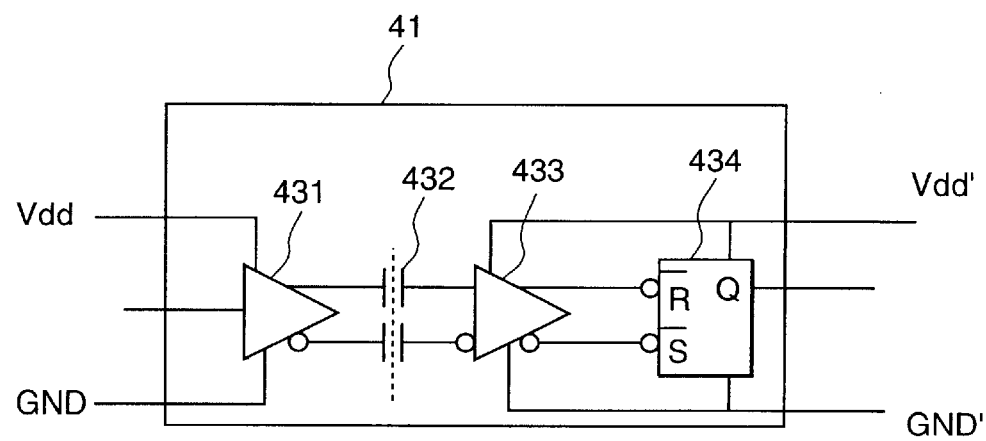
FIG. 6 is a schematic circuit diagram showing an embodiment of an isolator according to this invention.
Figure 7:
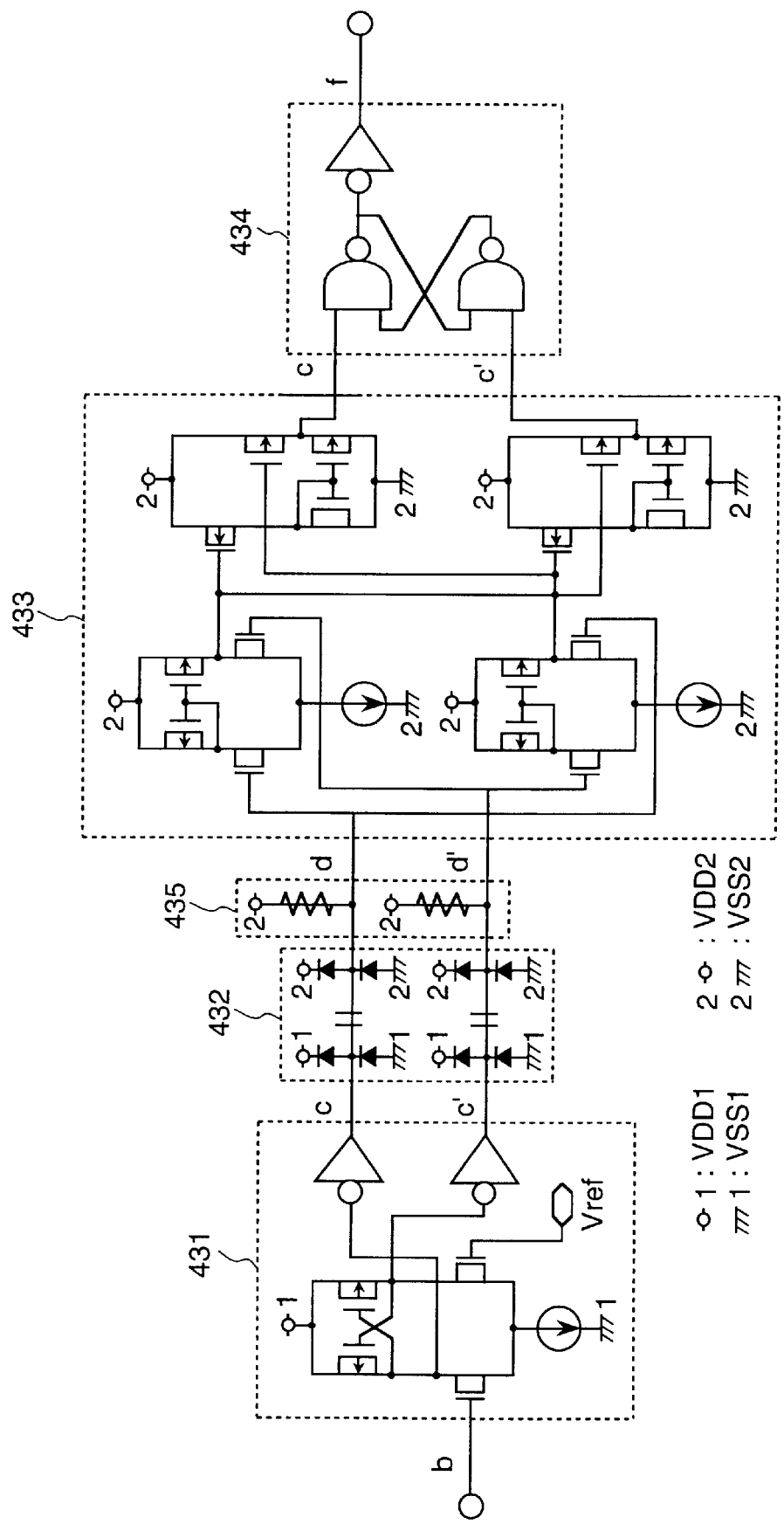
FIG. 7 is a schematic circuit diagram showing a detailed example of the isolator according to this invention.
Figure 8:
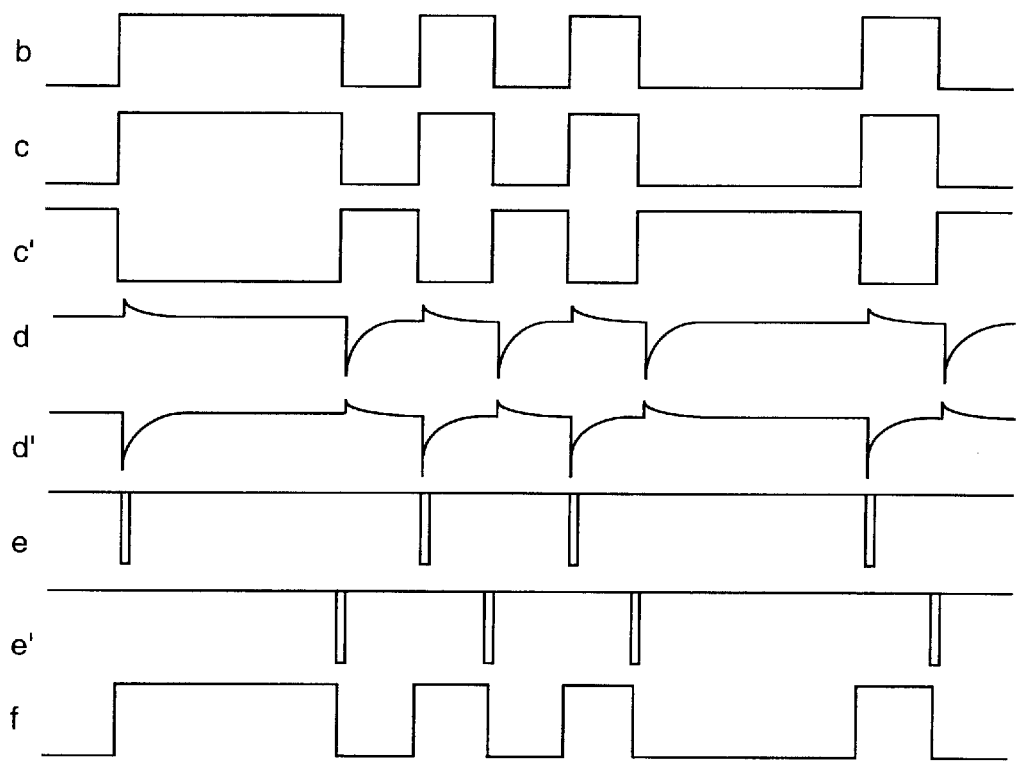
FIG. 8 is a diagram of the waveforms of various signals in the isolator.

FIG. 6 shows an embodiment of the isolator 41. The isolator 41 comprises a driver 431 having differential outputs, a coupling capacitor 432, an operational amplifier 433 and an RS flip-flop 434. FIG. 7 shows in detail the circuits of the respective components in FIG. 6. FIG. 8 shows the signal waveforms at various portions in the circuits in FIG. 7. A detailed explanation of the isolator 41 shown in FIG. 6 and FIG. 7 and the method of forming it on a semiconductor substrate is described in the above-mentioned Japanese Patent Application Laid-Open No.11-136293 (1999) entitled "Isolator Circuit and Monolithic Isolator" and Japanese Patent Application Laid-Open No. 11-317445 (1999) entitled "Isolator and Modem Device using it", and, therefore, further description is omitted in this specification.

Figure 9:
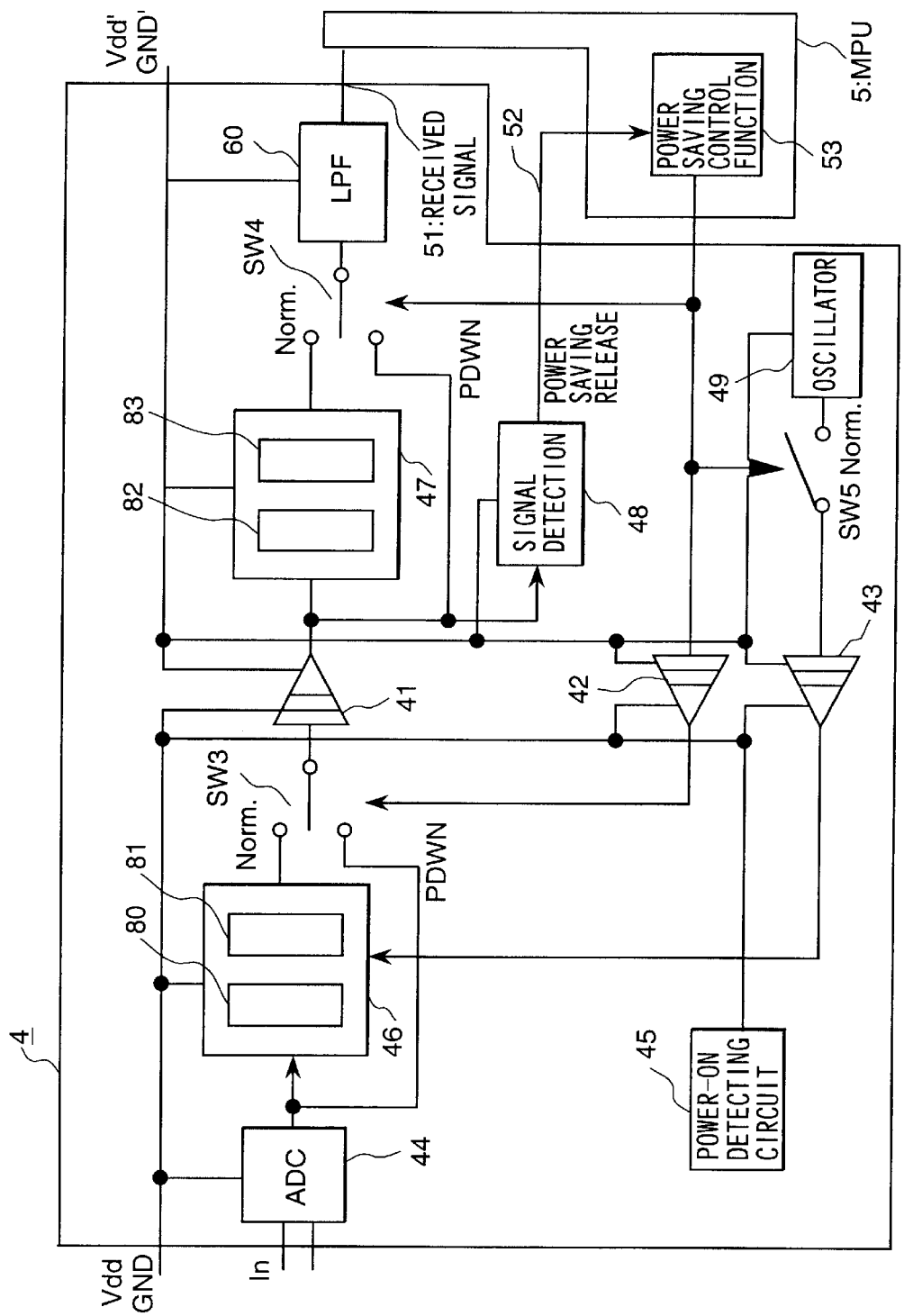
FIG. 9 is a schematic diagram showing in detail a line interface circuit according to this invention.

FIG. 9 shows in more detail an embodiment of the line interface circuit 4 in FIG. 2. In FIG. 9 an ADC (analogue digital converter) 44 is used in the usual path 40 and the power saving path 70 concurrently.

The usual path 40 is comprised of the ADC 44 and an isolator interface 46. The isolator interface 46 comprises a multiplexer 80 or a parallel serial converter 81 which is necessary for transmitting, through a Single isolator 41, the output of the ADC 44 constituted by a plurality of bits. Also, through the multiplexer 80, it is possible to transmit to the host side status information which includes various information signals at the line side, such as status information signals in the various portions of the line interface circuit, including an operation mode signal, for example, together with the output of the ADC 44. This isolator interface 46, comprised of the multiplexer or the parallel serial converter, has a large power consumption because it operates in synchronization with a clock, so that the usual path 40, including the isolator interface 46 has a larger electric power consumption than the power saving path 70.

On the other hand, the power saving path 70 is comprised of the ADC 44. Since, at the time of the calling signal waiting or Caller ID signal reception in which the power saving path 70 is operated, a high dynamic range, S/N characteristic is not required compared with the usual calling communication, it is possible to use an ADC having a smaller bit number than the one used at the time of the usual calling communication. Thus, in this embodiment, only the most significant bit of the output of the ADC 44 is directly connected to the isolator 41 by bypassing the isolator interface 46. With this arrangement, it is possible to maintain a power consumption which is lower than that in the case of the usual path 40.

Accordingly, it is possible to reduce the power consumption of the isolator interface and the analogue digital converter (ADC), and to activate the calling signal reception or Caller ID signal reception function only with electric power supplied from the system switch, while maintaining the on-hook condition, and, therefore, it is possible to maintain a small power consumption.

The normal path 40 and the power saving path 70 are switched by a switch SW3. A signal for controlling the switch SW3 is transmitted from the host side through the isolator 42 to the switch SW3 at the line side.

A clock signal with which the isolator interface 46 operates is generated by an oscillator 49 at the host side, is transmitted to the line side through an isolator 43 and is supplied to the isolator interface 46. Also, at the time of the received call signal waiting or the Caller ID receiving, during which the usual path 40 does not operate a switch SW5 is opened to stop the clock signal supply to the line side, thereby to reduce the power consumption of the line side, including a clock signal distributing system.

Incidentally, although it is shown in the figure that the switch SW5 is opened to stop the clock signal supply, the operation of the oscillator 49 itself may be shut down. This can further reduce the consumption of electric power. As this method of shutting down the operation of the oscillator 49, a method of carrying out clamping by using a bias, for example, may be used.

At the time of the usual calling or communication, the input signal which was transmitted to the line side through the isolator 41 is input to a LPF (Low Pass Filter) 60 through an isolator interface 47, which is comprised of a de-multiplexer 82 or a serial parallel converter 83.

The LPF 60 eliminates noise components by removing, in general, unnecessary high frequency components and prevents aliasing. Also, in an over-sampling analogue digital converter, the function of a decimator filter for effecting decimation (thinning) by which the sampling frequency is decreased is included in the LPF 60. The output of the LPF 60 is input as data to an MPU 5 and is processed therein. Recently, a soft modem, which achieves modulation and demodulation for a modem with software, has become widely used. This embodiment similarly performs modulation and demodulation for the modem operation in the MPU 5 in a software manner.

Figure 10:
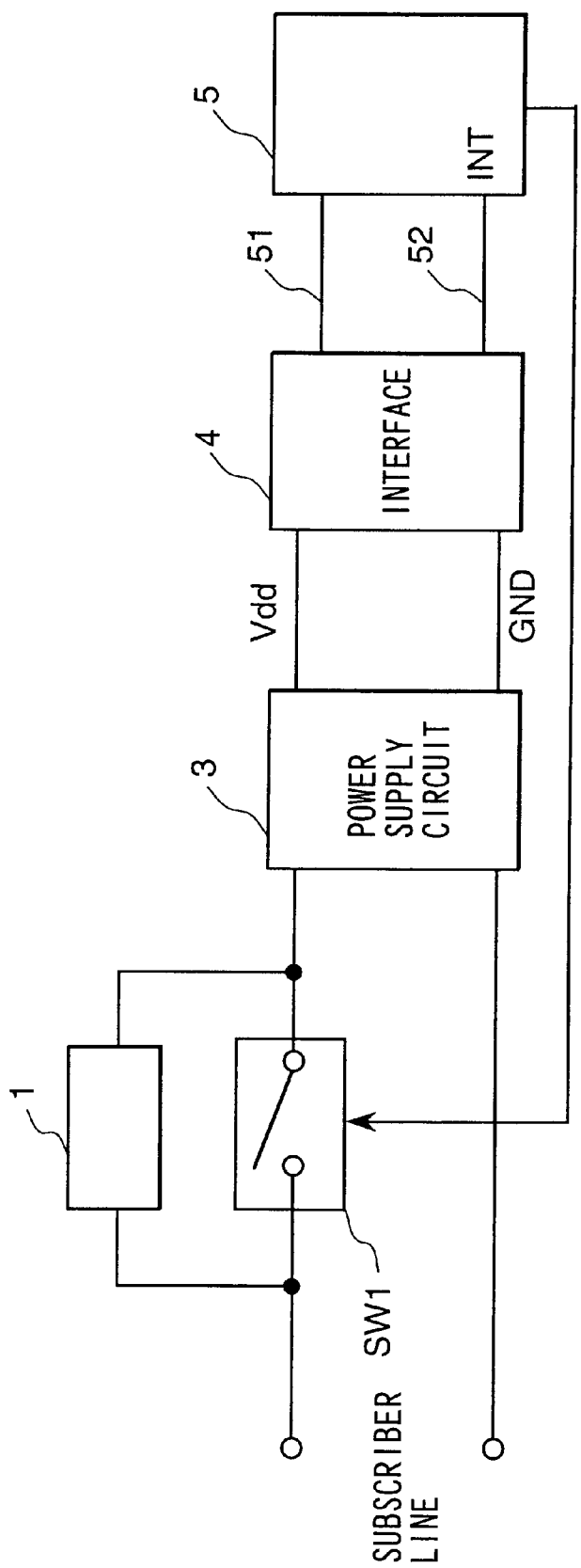
FIG. 10 is a block diagram showing another embodiment of a line interface circuit according to this invention.

At the time of calling signal waiting, the input signal which was transmitted from the line side through the isolator 41 is input to a signal detecting circuit 48. The signal detecting circuit 48 detects any calling signal by detecting the zero-cross points of the signal and outputs a power saving release signal 52 which will be applied to a power saving control function 53. The power saving control function 53 receives this power saving release signal 52 and controls the switches SW3 through SW5. In this embodiment, the power saving control function 53 is carried out within the MPU 5. In this case, the power saving release signal 52 is input as an interrupt signal (INT) to the MPU 5, as shown in FIG. 10, and the power saving control function 53 performs an interrupt process or a series of processes starting from the interrupt process.

At the time of receipt of a Caller ID indication, the input signal which was transmitted from the line side through the isolator 41 bypasses the isolator interface 47 and is input directly to the LPF 60.

The signal transmission paths as mentioned above are represented as follows per an operation mode. Incidentally, at the time of the mode in which the signal does not pass the LPF 60 (at the time of the calling signal waiting), it is possible to reduce the consumption of power at the host side by stopping the clock supply to the LPF 60, although this is not shown in the drawing. At the time of normal operation: the signal path is through the ADC 44—the isolator interface 46—the switch SW3 (Norm.)—the isolator 41 the isolator interface 47—the switch Sw4 (Norm. the LPF 60 the MPU 5.

At the time of the calling signal waiting: the signal path is through the ADC 44—the switch SW3 (PDWV)—the isolator 41—the signal detecting circuit 48—the power saving control function 53 the respective switches for their control.

At the time of the Caller ID reception: the signal path is through the ADC 44—the switch SW3 (PDWN)—the isolator 41—the switch SW4 (PDWN)—the LPF 60—the MPU 5.

The above-mentioned explanation refers to the signal receiving system. A communication device, such as a modem, an automatic answering and recording device, a facsimile machine or the like, which is connected to the telephone subscriber line, can fully demonstrate its capabilities by having its receiving system and transmitting system cooperate with each other. Since this invention relates to the receiving system, especially to the Caller ID reception function which uses power supplied from the system switch in the form of a loop current for the direct current closed coupling, a detailed explanation of the transmitting system is omitted. Incidentally, in the embodiment shown in FIG. 9, if the control signal transmitted through an isolator 42 is transmitted, like the reception signal, as s signal multiplexed with the transmission signal by the isolator interface comprised of the multiplexer 80 and the de-multiplexer 82, it is possible to decrease the number of isolators.

By combining the receiving system, especially the Caller ID receiving function provided in accordance with this invention, with the transmitting system provided in accordance with the prior art, it is possible to operate the line interface circuit 4 utilizing electric power supplied from the system switch not only at the time of normal operation, but also at the time of call signal waiting, reception and Caller ID reception, thereby to reduce the substantial consumption of electric power by the line interface circuit 4 (the electric power supplied from the host side) and to prolong battery life to a large degree in the case of an operation using the battery. Also, it is not necessary to provide a special power supply for the Caller ID receiving function. For example, it is not necessary for electric power to be supplied from the host side through a capacitor. In general, a capacitor on the order of 100 pF is needed for the supply of power. However, such a capacitor with a high capacitance cannot be formed on an economical chip area of a monolithic LSI, and, therefore, it must be connected externally. However, in accordance with this invention, it is not necessary to use the capacitor for the supply of electric power, and it is sufficient to use a capacitor of less than 1 pF in the isolator for signal transmission. Such small capacitor having a capacitance of less 1 pF can be formed on an effectively economical chip area of the monolithic LSI, and, therefore, it is possible, with a monolithic LSI, to provide the interface circuit 4, including therein the isolator function.

FIG. 10 shows an embodiment of a soft modem for achieving the modem modulation and demodulation function and the power saving control function 53 in a software manner within the MPU 5. A reception signal 51, which is output from the LPF 60, is input as data to the MPU 5, and, in the MPU 5, the modem modulation and demodulation process is carried out in a software manner. Also, the power saving release signal 52 is input as an interrupt signal (INT) to the MPU 5, and the power saving control function 53 and a series of processes (shown in FIG. 14) for the calling signal detection and the Caller ID reception are achieved as the interrupt process or a series of processes starting from the interrupt process.

Incidentally, as mentioned above, since this invention relates to the receiving system, the description and illustration of the transmitting system are omitted; however, it goes without saying that in a communication device, such as a modem, an automatic answering and recording device, a facsimile machine or the like which is connected to the telephone subscriber line the transmitting system, is also essential.

Figure 11:
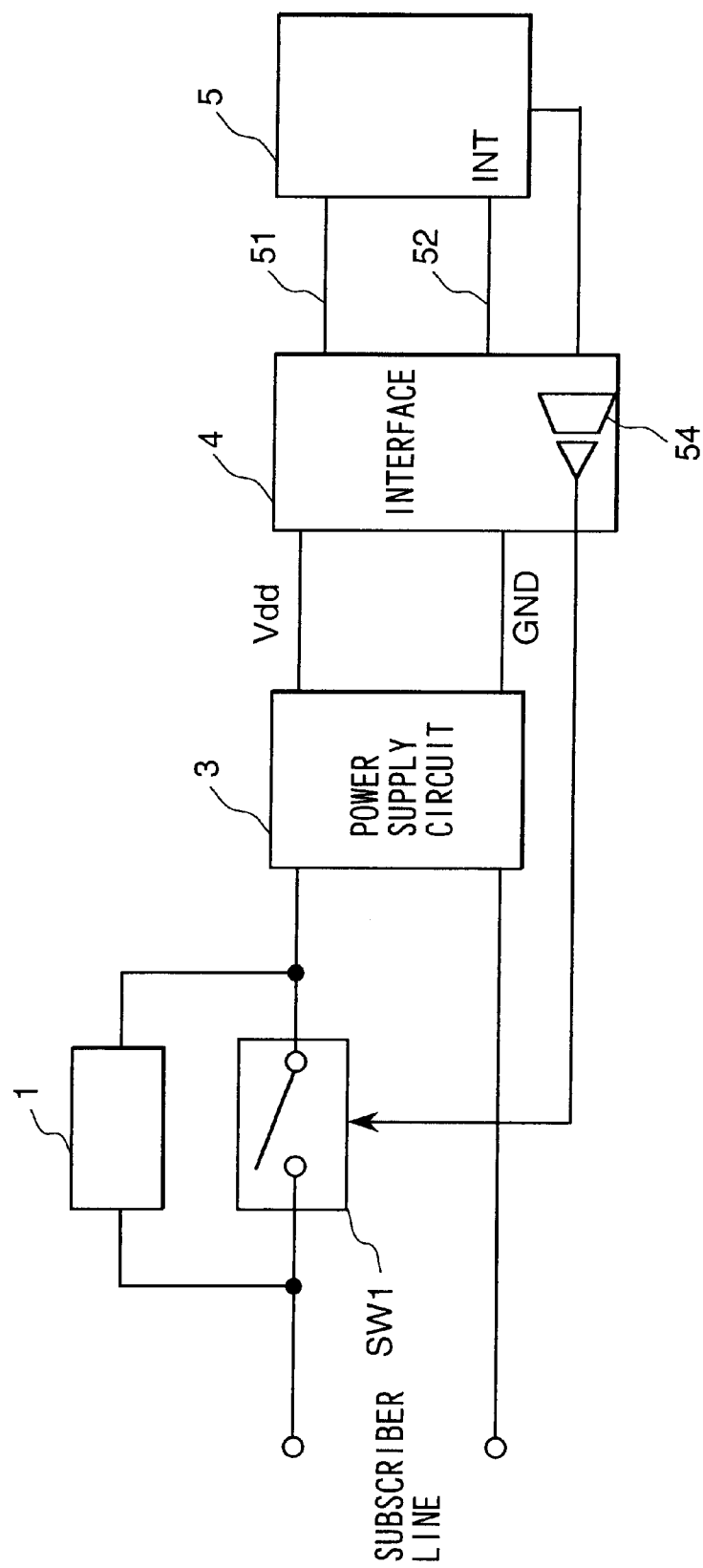
FIG. 11 is a block diagram showing still another embodiment of a line interface circuit according to this invention.

FIG. 11 shows an embodiment in which the control signal for the switch SW1 is transmitted in such a manner that it is also insulated by an insulator 54 housed within the line interface circuit 4. Also, if the control signal for the switch SW1, as well as the control signal for the respective switches transmitted through the isolator 42 in the embodiment in FIG. 9, is transmitted, like the reception signal, as a signal multiplexed with the transmission signal by the isolator interface comprised of the multiplexer 80 and the de-multiplexer 82, it becomes possible to reduce the number of isolators. In accordance with this embodiment, since the function of insulating and transmitting the control signal for the switch SW1 can be housed within the line interface circuit 4, it is possible to decrease the number of parts, and also to reduce the cost of the communication device, such as a modem, an automatic answering and recording device, a facsimile machine or the like, which is connected to the telephone subscriber line and make it smaller.

Figure 12:
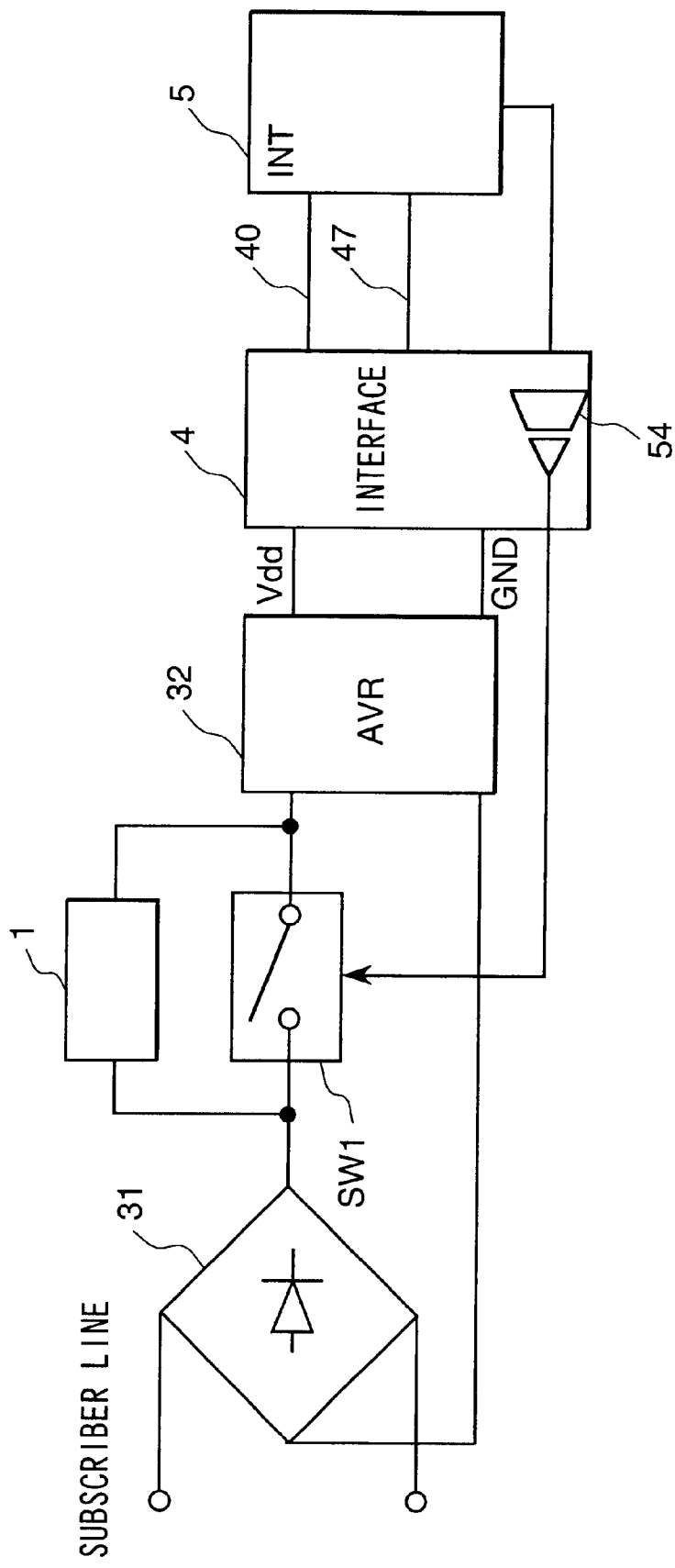
FIG. 12 is a block diagram showing a further embodiment of a line interface circuit according to this invention.

Incidentally, the switch SW1 may be interposed between a rectifier 31 and an AVR 32 which constitute the power supply circuit 3, as shown in FIG. 12.

Figure 13:
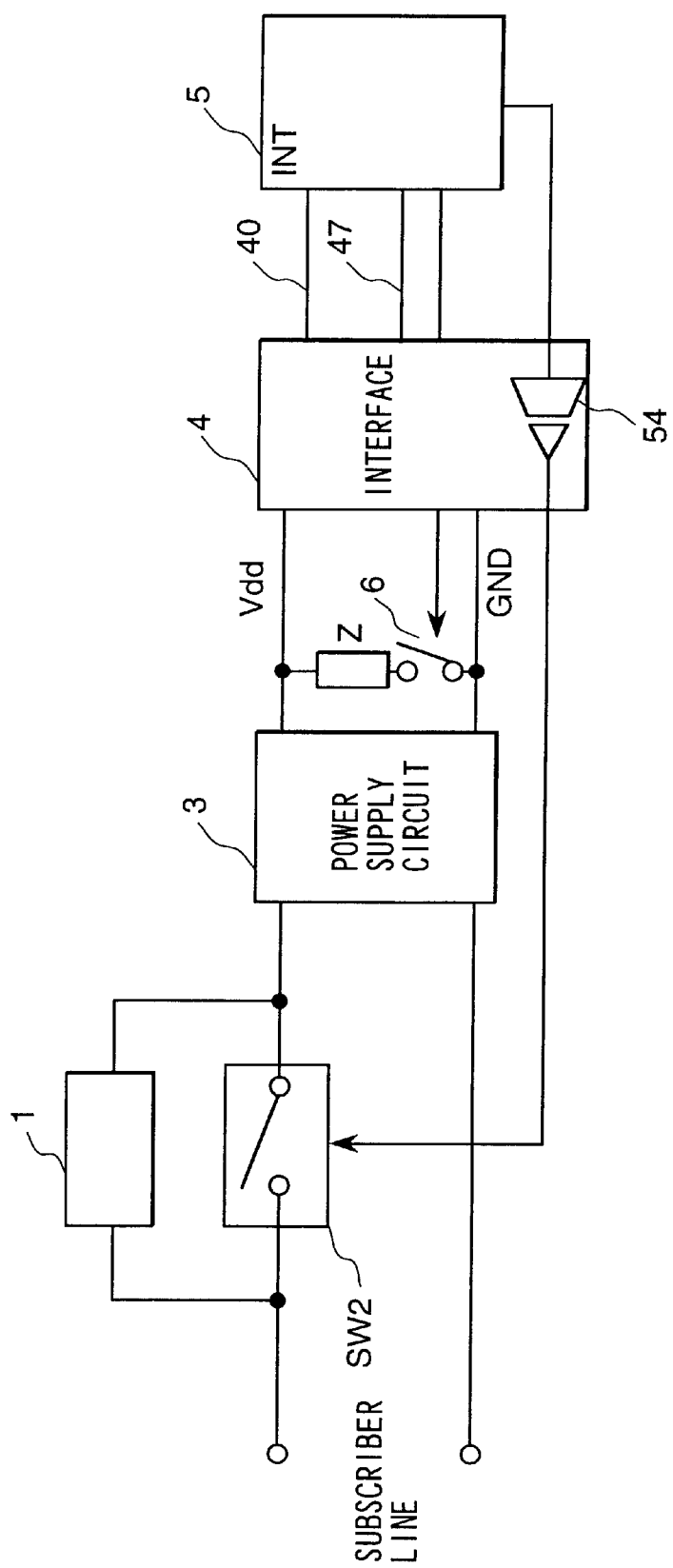
FIG. 13 is a block diagram showing a still further embodiment of a line interface circuit according to this invention.

FIG. 13 shows an embodiment in which the control signal for the switch SW2 for the direct current closed coupling is also isolated and transmitted through an isolator 54 which is housed within the line interface 4. If the control signal for the switch SW2 is transmitted in such a manner that it is also multiplexed with the transmission signal together with the control signal for the switch SW1 as well as the control signal for the respective switches transmitted through the isolator 42, as shown in the embodiment in FIG. 9, by using the isolator interface comprised of the multiplexer 80 and the de-multiplexer 83, like the reception signal, it becomes possible to reduce the number of isolators. In accordance with this embodiment, since the function by which the control signal for the switch SW2 is isolated and transmitted can be housed within the line interface circuit 4, it is possible to reduce the number of ports, and also to reduce the cost of the communication device, such as a modem, an automatic answering and recording device, a facsimile machine or the like, which is connected to the telephone subscriber line, and make it smaller.

Figure 14:
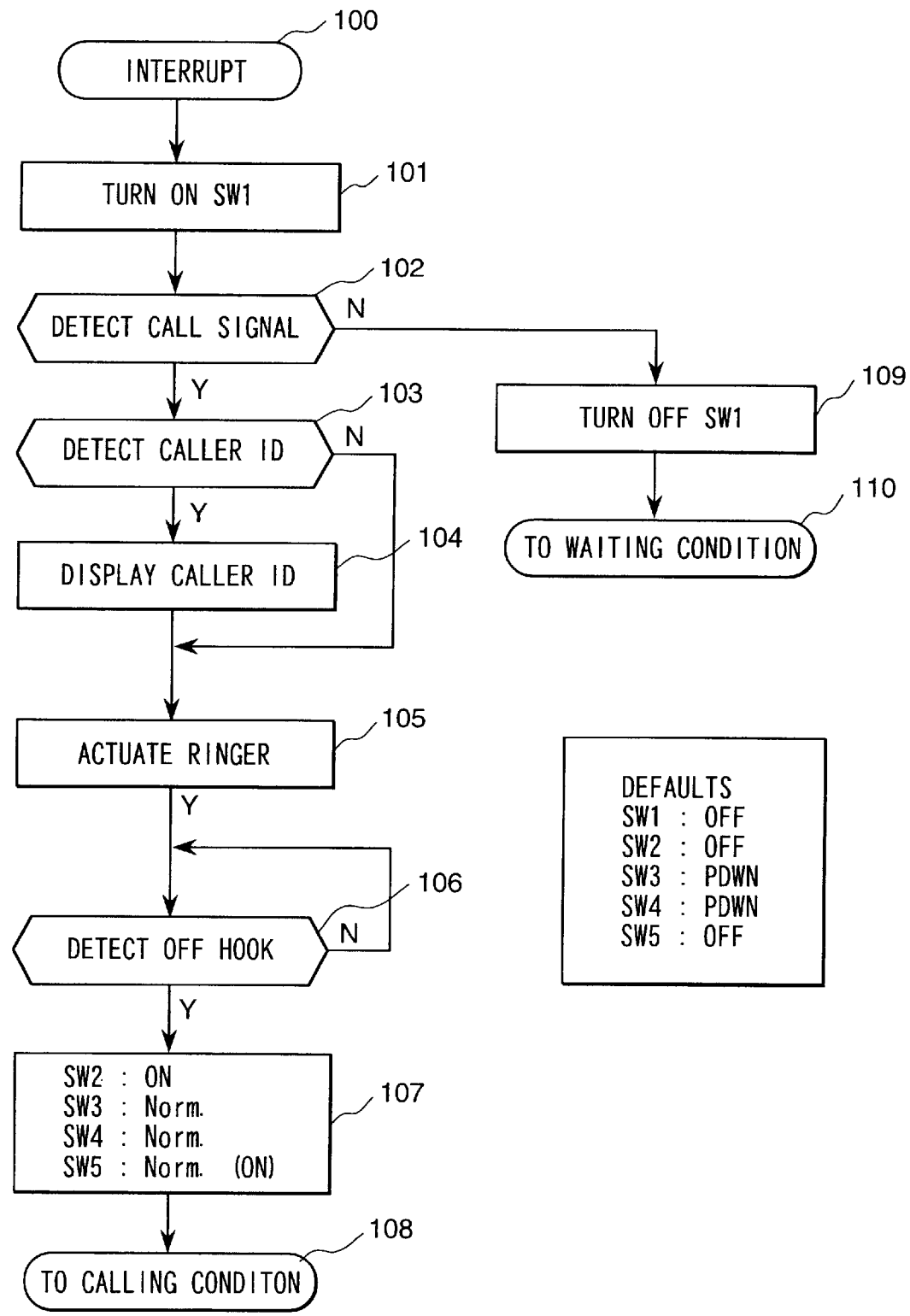
FIG. 14 is a diagram showing an example of the flow of the control in the operation of a line interface circuit according to this invention.

FIG. 14 shows an embodiment for effecting a series of processes for the power saving control function 53 and for the calling signal detection and the Caller ID reception. At the beginning, the initial value of each of the switches is set as shown as defaults in FIG. 14. This condition is the calling signal waiting condition. When the calling signal arrives, it is input to the line interface through the calling signal passing filter 1, as shown in FIG. 1, and the electric power obtained by rectifying the calling signal is supplied to the line interface. The input calling signal is digitalized in the ADC 42, as shown in FIG. 9, bypasses the isolator interface 46 and is input to the signal detecting circuit 48, which is located at the host side, through the switch SW3 and the isolator 41. The signal detecting circuit 48 detects the calling signal and outputs the power saving release signal 52. The power saving release signal 52 is input as an interrupt signal (INT) to the MPU 52 and initiates a series of processes by triggering an interrupt 100.

First, when the interrupt 100 occurs, in process 101, the switch SW1 is turned on to apply a direct current voltage from the system switch to the line interface 4 as its power source through the power supply circuit 3. At that time, Since the line interface 4, especially the line side, is in the power saving mode, the current flow is a slight value under a threshold value recognized as the direct current closed coupling condition, and, therefore, it is not regarded as the on-hook condition. In this condition, the calling signal is input to the MPU 5 through the LPF 60, the MPU 5 measures the period of the input signal (especially, the period of the zero-cross) and it is judged whether or not the input signal is the calling signal (process 102). Incidentally, in Japan the frequency of the calling signal is 16 Hz.

In a case where the input signal is not the calling signal, the switch SW1 is turned off again and the switch SW4 is positioned at the PDWN side, so as to return to the initial values (process 109) and the waiting condition (process 110). If the input signal is judged to be the calling signal, the Caller ID detecting process (process 103) is carried out. If the Caller ID is detected, the Caller ID is displayed (process 104) and the ringer is actuated (process 105). Thereafter, waiting is performed until the on-hook condition is established (process 106), and if the on-hook condition is established, in process 107 the switch SW2 is turned on and the switches SW3 and SW5 are positioned at the Norm. side, so as to be able to shift to the calling or communication condition (process 108).

Incidentally, at this stage, in the usual telephone equipment, the operation of picking up a telephone receiver (off-hook) is established as the off-hook condition. Also, in data communication equipment, such as a modem, etc., the following two cases can be considered:

(1) When the received Caller ID is matched with one pre-registered as a specific communication party; and
(2) When the received Caller ID does not match with one pre-registered as a specific communication party to whom the communication should be rejected.

Figure 15:
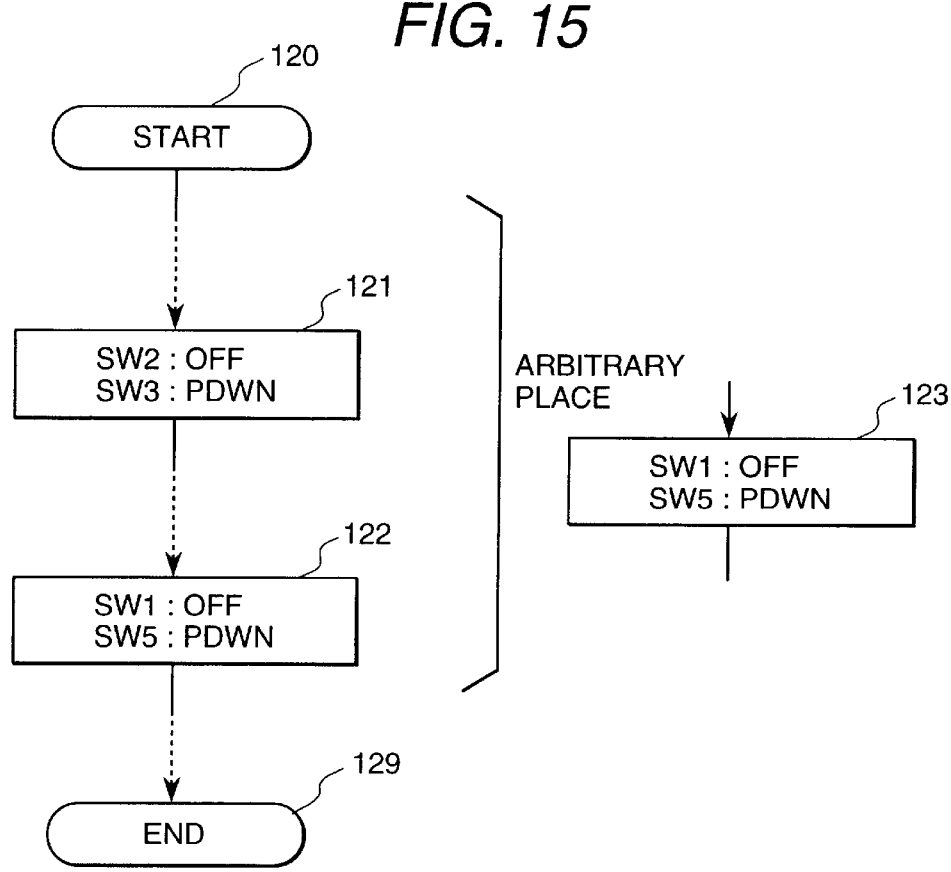
FIG. 15 is a diagram showing another example of the flow of the control in the operation of a line interface circuit according to this invention.

In process 107, the switch SW2 is turned on to cause the loop current of a stipulated value to flow, thereby to effect a direct current closed coupling, whereby the off-hook condition is indicated to the system switch. Also, the switch SW3 is positioned at the Norm. side to provide, the output of the ADC 44 to the isolator 41 through the isolator interface 46. Also, the switch SW5 is turned on to supply the clock to the line side, especially the isolator interface 46. Further, the switch SW4 is positioned at the Norm. side to input the signal to the LPF 60 through the isolator interface 47i FIG. 15 shows an embodiment for carrying out processes performed at the end of the communication. It is necessary to return the switches SW2 and SW3 at the line side to their initial conditions to establish the waiting condition. To this end, before the switch SW1 is turned off to stop the current supply from the system switch and the switch SW5 is turned off to stop the clock supply from the host side (process 122), the switch SW2 must be turned off to stop the direct current closed coupling, and the switch SW3 must be positioned at the PDWN side to establish the power saving mode (process 121). Incidentally, the timing of process 123 in which the switch SW4 is positioned at the PDWN side to bypass the isolator interface 47 may be optional.

Figure 16:
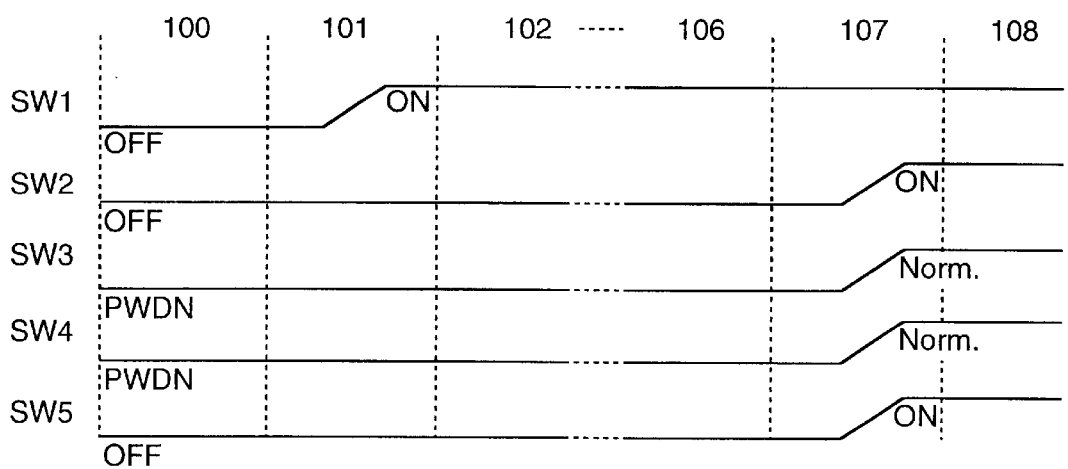
FIG. 16 is a timing diagram showing respective switch signals in a line interface circuit according to this invention.
Figure 17:
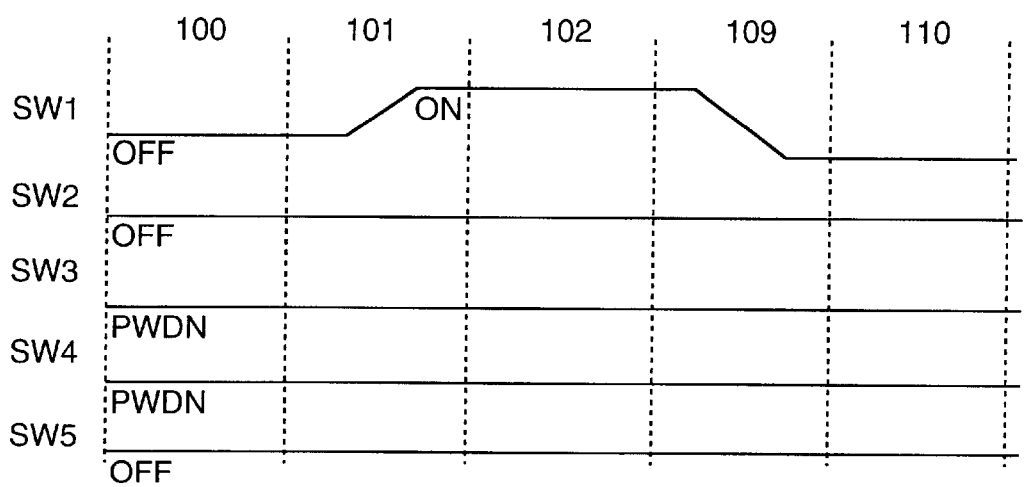
FIG. 17 is a timing diagram showing respective switch signals in a line interface circuit according to this invention.
Figure 18:
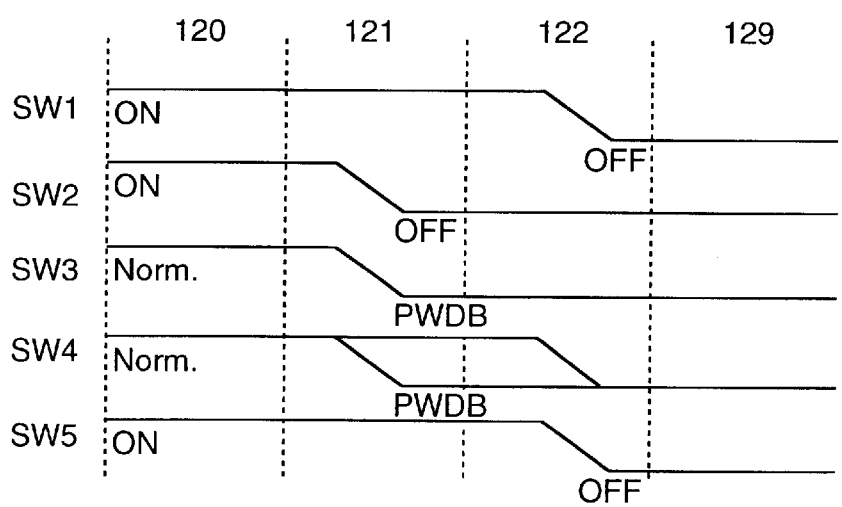
FIG. 18 is a timing diagram showing respective switch signals in a line interface circuit according to this invention.

FIG. 16 shows the state of the respective switches in a series of sequences starting from generation of the interrupt (process 100) and ending at the communication condition (process 108). FIG. 17 shows the state of the respective switches in a series of sequences starting from generation of the interrupt (process 100) and ending at the waiting condition (process 110). Further, FIG. 18 shows the state of the respective switches in a series of processing sequences associated with the start of communication 120 to the end of communication 129, as shown in FIG. 15.

Figure 19:
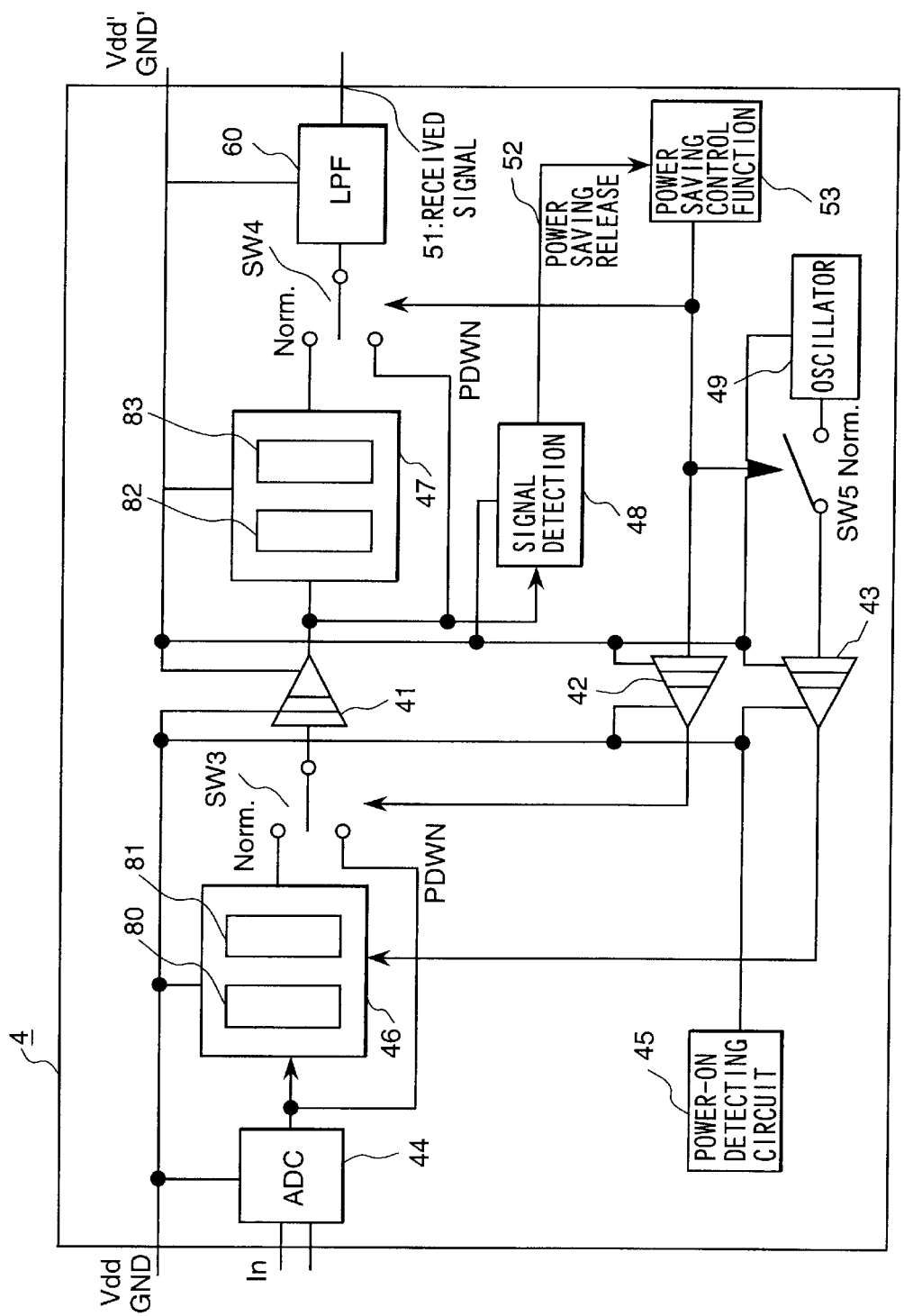
FIG. 19 is a schematic diagram showing another detailed embodiment of a line interface circuit according to this invention.

FIG. 19 shows an embodiment in which the power saving control function 53 is housed within the line interface 4, rather than in the MPU 5. The power saving control function 53 controls the respective switches on the basis of the power saving release signal 52 output from the signal detecting circuit 48 in response to the detection of the calling signal. According to this embodiment, Since the number of processes necessary for the MPU 5 is reduced, it is possible to improve the processing capability of the whole system because the processing capability of the MPU 5 can be allocated to the usual processing more abundantly. Also in this case, since data processing necessary for the Caller ID reception, etc. is initiated by the MPU 5, it is necessary to input the power saving release signal 52 as the interrupt signal (INT) to the MPU 5.

Figure 20:
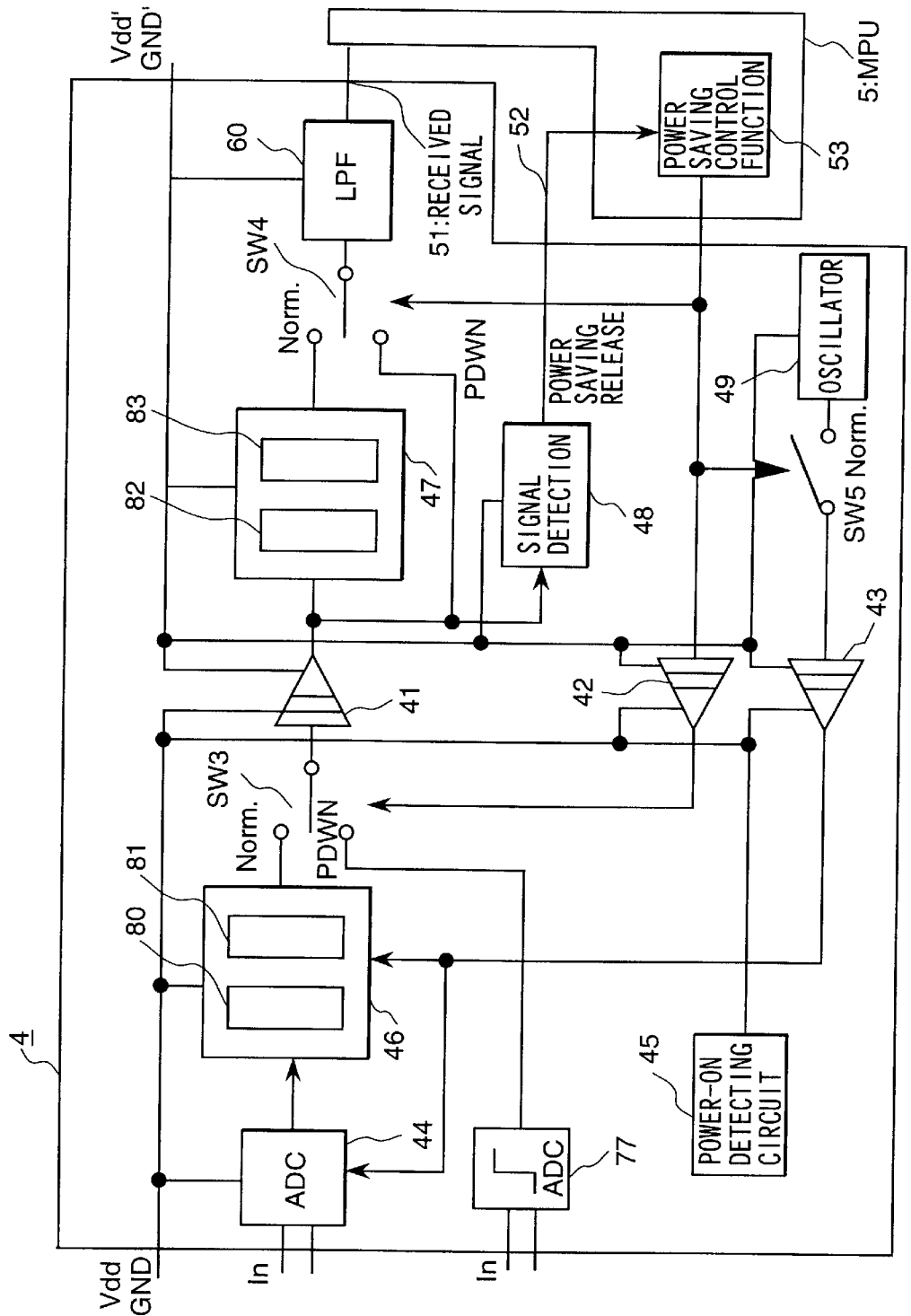
FIG. 20 is a schematic diagram showing still another detailed embodiment of a line interface circuit according to this invention.

FIG. 20 shows an embodiment in which the ADC 44, which is a first analogue digital converter, is used exclusively for the usual path 40, and an additional ADC 77, which is a second analogue digital converter comprising a one-bit zero-cross circuit, is used exclusively for the power saving path 70. The ADC 44 for the usual path 40 adopts in many cases an over-sampling scheme, and, therefore, it is essential to use a clock signal for controlling the integration time in an integrating circuit within the ADC 44. This leads to a large power consumption. In view of this, in this embodiment, the one-bit zero-cross circuit, which is used exclusively for the power saving path 70, is provided as the ADC 77 to reduce the power consumption.

Also, by forming the ADC 44, the ADC 77, the isolators, the isolator interfaces on a single semiconductor chip as the line interface circuit, a low cost and small size line interface circuit and an information communicating apparatus using it can be provided.

Figure 21:
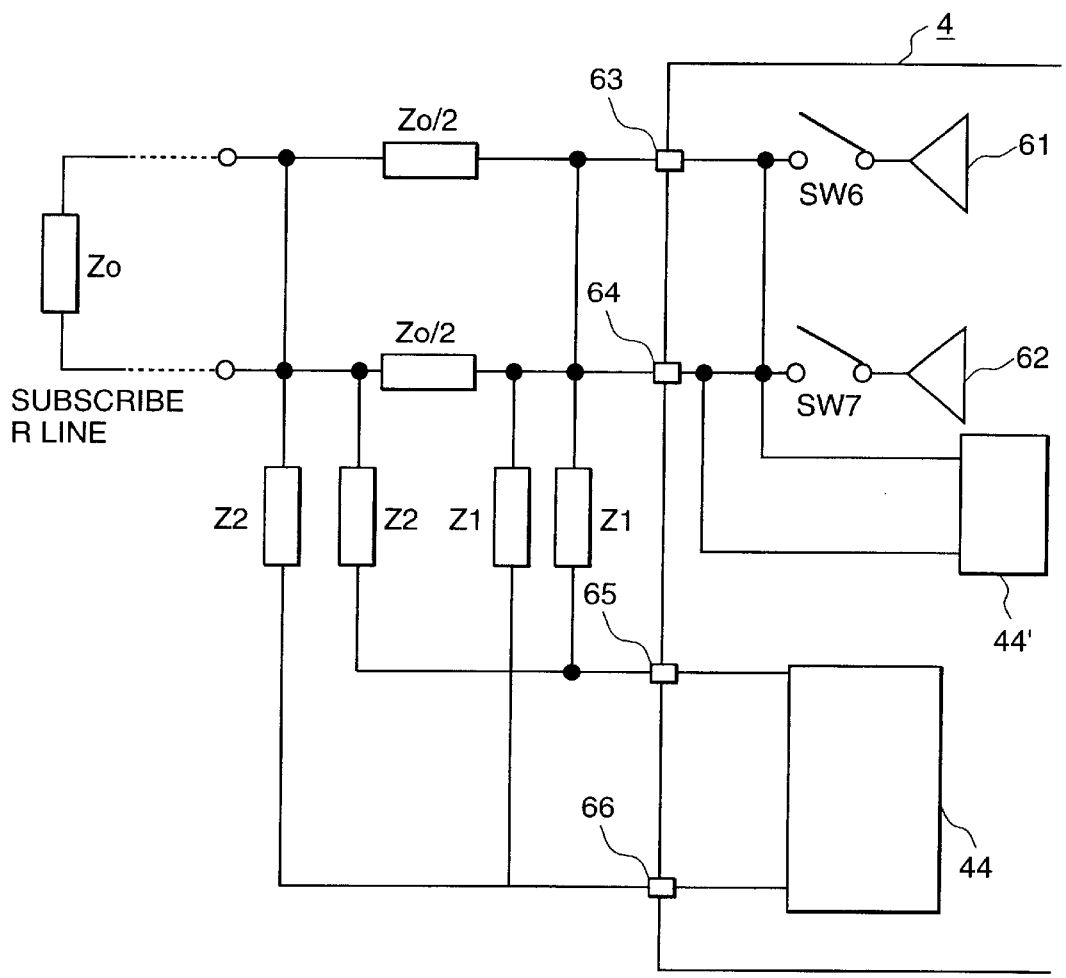
FIG. 21 is a schematic diagram showing an embodiment of a connection arrangement with a hybrid circuit according to this invention.

FIG. 21 shows an embodiment of a method of connecting the power saving path 70 to an outside circuit (hybrid circuit (2-wire/4-wire changing circuit) for sharing a subscriber line of one set of wires with the transmitting and receiving systems). The line interface circuit 4 is formed on a monolithic LSI, so that it is connected to the outside circuit (hybrid circuit) via the output terminals 63 and 64 of the transmitting system, and the input terminals 65 and 66 of the receiving system. In this case, the input of the power saving path 70 is connected to the output terminals 63 and 64 of the transmitting system, and the outputs of the drivers 61 and 62 of the transmitting system are connected to the output terminals 63 and 64 of the transmitting system through switches SW6 and SW7, respectively. At the time of the usual call or communication, the switches SW6 and SW7 are closed so that the outputs of the drivers 61 and 62 of the transmitting system are output to the outside circuit via the output terminals 63 and 64 of the transmitting system, respectively. On the other hand, at the time of the calling signal reception or at the time of the Caller ID signal reception, the switches SW6 and SW7 are opened, so that a signal applied to the output terminals 63 and 64 of the transmitting circuit from the outside circuit is input to the power saving path 70.

Now, turning attention to the construction of the hybrid circuit, the signal toward the input terminals 65 and 66 of the receiving system is voltage-divided by Z1 and Z2, and the amplitude of the divided signal becomes smaller than that of the original signal coming from the subscriber line. This is a compensation which is inevitable to cancel the transmission output in the hybrid circuit. On the other hand, in a case where the switches SW6 and SW7 are opened, the signal coming from the subscriber line is applied to the output terminals 63 and 64 of the transmitting system without attenuating its amplitude. That is to say, by connecting the input of the power saving path 70 to the output terminals 63 and 64 of the transmitting system in accordance with this embodiment, it is possible to input the Caller ID signal having the largest amplitude to the power saving path 70 without providing any dedicated input terminal. This leads to a simplification in circuit configuration and a reduction in consumption of power in the power saving path 70 without the need for signal amplification. Incidentally, it is natural that, since at the time of the Caller ID signal reception, the transmission signal is not output, it is not necessary to cancel the transmission output, and the direct connection of the power saving path 70 to the output terminals 63 and 64 of the transmitting system has no harmful effects.

In accordance with this invention, it is possible to reduce the consumption of power of the calling signal reception and Caller ID signal reception function, and to operate the calling signal reception and Caller ID signal reception function with the supply power from the system switch while maintaining the on-hook condition.

Also, it is possible to operate the calling signal reception and Caller ID signal reception function, as well as the transmission and reception function, of the line side at the time of the usual operation substantially without supply of outside power.

What is claimed is:

1. A line interface circuit having an analogue digital converter, an isolator and an isolator interface:
   wherein said isolator interface has a parallel serial converter circuit for converting the output of said analogue digital converter having a plurality of bits into a serial signal, or a multiplexer for transmitting in a time division manner the output of said analogue digital converter and the status information of the line interface circuit;
   wherein at the time of the usual operation the output of said analogue digital converter is input to said isolator via said isolator interface; and
   wherein at the time of the calling signal reception or at the time of the caller identification information reception the output of said analogue digital converter is input directly to said isolator.

2. A line interface circuit according to claim 1:
   wherein said isolator interface operates with a clock; and
   wherein at the time of the calling signal reception or at the time of the caller identification information reception the clock supplying made to said isolator interface is stopped.

3. A line interface circuit according to claim 1:
   wherein said analogue digital converter, said isolator and said isolator interface are formed on a single semiconductor chip.

4. An information communicating apparatus having the line interface circuit according to claim 1:
   wherein electric power to the isolated region at the subscriber line side of said line interface circuit is supplied from a switching machine through the subscriber line.

5. A line interface circuit having a first analogue digital converter, a second analogue digital converter, an isolator and an isolator interface:
   wherein said isolator interface has a parallel serial converter circuit for converting the output of said analogue digital converter having a plurality of bits into a serial signal, or a multiplexer for transmitting in a time division manner the output of said analogue digital converter and the status information of the line interface circuit;
   wherein at the time of the usual operation the output of said first analogue digital converter is input to said isolator via said isolator interface; and
   wherein at the time of the calling signal reception or at the time of the caller identification information reception the output of said second analogue digital converter is input directly to said isolator.

6. A line interface circuit according to claim 5:
   wherein said isolator interface operates with a clock; and
   wherein at the time of the calling signal reception or at the time of the caller identification information reception the clock supplying made to said isolator interface is stopped.

7. A line interface circuit according to claim 5:

wherein said first analogue digital converter operates with a clock;

wherein said second analogue digital converter operates without a clock; and wherein at the time of the calling signal reception or at the time of the caller identification information reception the clock supplying made to said first analogue digital converter is stopped.

8. A line interface circuit according to claim 5:

wherein said first analogue digital converter, said second analogue digital converter, said isolator and said isolator interface are formed on a single semiconductor chip.

9. A line interface circuit according to claim 8:

wherein the input of said second analogue digital converter is connected to the transmission output terminals of said single semiconductor chip.

10. An information communicating apparatus having the line interface circuit according to claim 5:

wherein electric power to the isolated region at the subscriber line side of said line interface circuit is supplied from a switching machine through the subscriber line.

11. A line interface circuit having an analogue digital converter, an isolator and an isolator interface:

wherein said isolator interface has a parallel serial converter circuit for converting the output of said analogue digital converter having a plurality of bits into a serial signal, or a multiplexer for transmitting in a time division manner the output of said analogue digital converter and the status information of the line interface circuit, and a clock generating circuit for producing a first frequency clock and a second frequency clock whose frequency is lower than the first frequency;

wherein at the time of the usual operation said analogue digital converter and said isolator interface operate with said first frequency clock output from said clock generating circuit; and wherein at the time of the calling signal reception or at the time of the caller identification information reception said analogue digital converter and said isolator interface operate with said first frequency clock output from said clock generating circuit.

12. An information communicating apparatus having the line interface circuit according to claim 11:

wherein electric power to the isolated region at the subscriber line side of said line interface circuit is supplied from a switching machine through the subscriber line.

* * * * *